(12) United States Patent
Otani et al.

(10) Patent No.: US 10,031,368 B2
(45) Date of Patent: Jul. 24, 2018

(54) HEAD-UP DISPLAY (71) Applicant: Panasonic Intellectual Property Management Co., Ltd., Osaka (JP)

(72) Inventors: Sosuke Otani, Osaka (JP); Yoshimasa Fushimi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/614,539

(22) Filed: Jun. 5, 2017

(65) Prior Publication Data
US 2017/0269428 A1    Sep. 21, 2017

Related U.S. Application Data

(63) Continuation of application No. PCT/JP2016/000970, filed on Feb. 24, 2016.

(30) Foreign Application Priority Data

Mar. 19, 2015    (JP) .................................. 2015-055658

(51) Int. Cl.
*H04N 1/04*    (2006.01)
*G02F 1/1335*    (2006.01)
(Continued)

(52) U.S. Cl.
CPC ........ *G02F 1/133536* (2013.01); *F21V 5/007* (2013.01); *G02B 5/3025* (2013.01); *G02B 6/0055* (2013.01); *G02B 27/0101* (2013.01)

(58) Field of Classification Search
CPC .......................... G03B 21/005; G03B 21/2033; G03B 21/208; H04N 5/23238; H04N 9/3161;
(Continued)

(56) References Cited

U.S. PATENT DOCUMENTS 5,892,598 A * 4/1999 Asakawa ............... G02B 27/01
  345/7
8,521,411 B2 * 8/2013 Grabowski .......... G01C 21/365
  701/454

(Continued)

FOREIGN PATENT DOCUMENTS

EP    710866    5/1996
JP    8-123333    5/1996
(Continued)

OTHER PUBLICATIONS

International Search Report of PCT application No. PCT/JP2016/000970 dated May 17, 2016.

*Primary Examiner* — Negussie Worku
(74) *Attorney, Agent, or Firm* — Wenderoth, Lind & Ponack, L.L.P.

(57) ABSTRACT

A head-up display includes an image light output device for outputting image light, a first optical element, a second optical element, and a third optical element. The first optical element is provided to be inclined with respect to the output surface of the image light output device. The first optical element reflects the image light having a first polarization direction and allowing the image light having second polarization direction to pass through. The second optical element reflects the image light from the first optical element to the first optical element. The third optical element is disposed between the first and the second optical element, and converts the image light having the first polarization direction to the image light having the second polarization direction by allowing the image light to pass through back and forth. The image light passing through the first optical element is projected on a combiner.

13 Claims, 9 Drawing Sheets

(51) Int. Cl.
*G02B 27/01* (2006.01)
*G02B 5/30* (2006.01)
*F21V 8/00* (2006.01)
*F21V 5/00* (2018.01)

(58) Field of Classification Search
CPC ...... H04N 5/64; H04N 5/7491; H04N 9/3129; H04N 9/3147; B01J 12/02; G01B 5/00; G02F 1/136277; G03H 1/0248; G06F 3/013
USPC ....... 345/7, 87, 102, 2.3, 9; 348/115, 36, 41, 348/790
See application file for complete search history.

(56) References Cited

U.S. PATENT DOCUMENTS

| | | | | |
|---|---|---|---|---|
| 9,429,757 | B1* | 8/2016 | Peeri | G02B 27/0172 |
| 9,766,455 | B2* | 9/2017 | Liu | G02B 27/0101 |
| 9,829,782 | B2* | 11/2017 | Koyanagi | G03B 21/625 |
| 2012/0133907 | A1* | 5/2012 | Otani | G03B 21/16 |
| | | | | 353/58 |
| 2012/0188520 | A1* | 7/2012 | Otani | G02B 27/102 |
| | | | | 353/84 |
| 2014/0132850 | A1* | 5/2014 | Otani | H04N 13/0434 |
| | | | | 349/5 |
| 2016/0103320 | A1* | 4/2016 | Kovaluk | G02B 27/0101 |
| | | | | 345/7 |
| 2016/0116736 | A1* | 4/2016 | Andersson | G03B 21/2013 |
| | | | | 353/13 |
| 2016/0161755 | A1* | 6/2016 | Yonekubo | G02B 27/4227 |
| | | | | 345/8 |
| 2016/0209647 | A1* | 7/2016 | Fursich | G02B 27/0093 |
| 2016/0344986 | A1* | 11/2016 | Hirakawa | G02B 27/104 |
| 2017/0192234 | A1* | 7/2017 | Lai | G02B 27/0149 |
| 2017/0227761 | A1* | 8/2017 | Nakamura | G02B 26/126 |

FOREIGN PATENT DOCUMENTS

| | | |
|---|---|---|
| JP | 8-258589 | 10/1996 |
| JP | 9-508477 | 8/1997 |
| JP | 2014-044244 | 3/2014 |
| JP | 2014-170112 | 9/2014 |
| WO | 1995/021391 | 8/1995 |

* cited by examiner

HEAD-UP DISPLAY

BACKGROUND

1. Technical Field

The present disclosure relates to head-up displays installed in automobiles including private cars.

2. Description of the Related Art

PTL1 discloses a head-up device that projects a display image on a projection plane of a mobile object to visibly display a virtual image of the display image on a visible area inside the mobile object.

CITATION LIST

Patent Literature

PTL1: Japanese Patent Unexamined Publication No. 2014-170112

SUMMARY

The present disclosure offers a head-up display whose volume can be reduced as much as possible.

The present disclosure is a head-up display that includes an image fight output device for outputting image light, a first optical element, a second optical element, and a third optical element. The first optical element is provided to be inclined with respect to the output surface of the image light output device. The first optical element reflects the image light having a first polarization direction and allowing the image light having a second polarization direction different from the first polarization direction to pass through. The second optical element reflects the image light from the first optical element to the first optical element. The third optical element is disposed between the first optical element and the second optical element, and converts the image light having the first polarization direction to the image light having the second polarization direction by allowing the image light to pass through back and forth. The image light passing through the first optical element is projected on a combiner.

The head-up display of the present disclosure can reduce its volume as much as possible.

DETAILED DESCRIPTION

Exemplary embodiments are detailed below with reference to drawings as appropriate. However, a detailed description more than necessary may be omitted, such as a detailed description of a well-known item and a duplicate description for substantially identical component. This avoids an unnecessarily redundant description and to allow those skilled in the art to easily understand the following description.

Note that accompanying drawings and the following description are provided for those skilled in the art to well understand the present disclosure, and do not intend to limit the subjects described in the claims.

First Exemplary Embodiment

The first exemplary embodiment is described below with reference to FIG. 1 to FIG. 5.

[1-1. Overall Structure]

Figure 1:
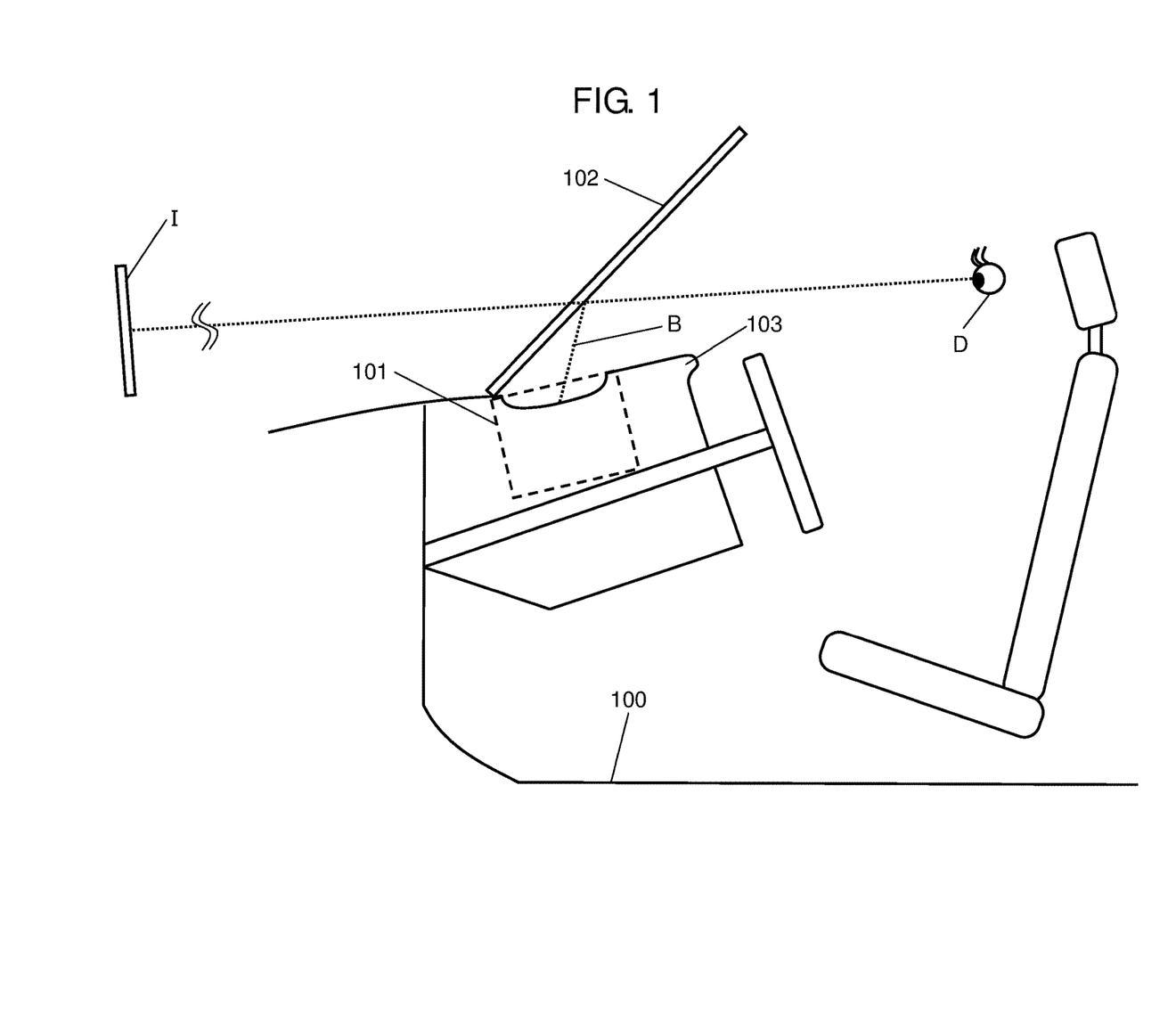
FIG. 1 is a fragmentary schematic view of an automobile equipped with a head-up display of the present disclosure.

FIG. 1 is a fragmentary schematic view of automobile 100 equipped with head-up display (hereinafter referred to as "HUD") 101 in the first exemplary embodiment. Automobile 100 is an example of mobile object.

Head-up display 101 is disposed inside dashboard 103, as shown in FIG. 1. Head-up display 101 is an image display device that emits image light B and lets driver D (observer) view virtual image 1 by reflecting image light B windshield 102 that functions as a combiner.

The combiner is semi-transmissive optical element that superimposes a first image of image light B output from head-up display 101 on a second image, which is background. In this case, the second image is a front view that driver D can see through windshield 102. Virtual image I of image light B from head-up display 101 is superimposed on this front view of windshield 102, and driver D can view a superimposed image.

The combiner is the windshield of automobile 100 in the exemplary embodiment, but it may be a half mirror disposed independent from the windshield.

[1-2. Structure of HUD]

Figure 2:
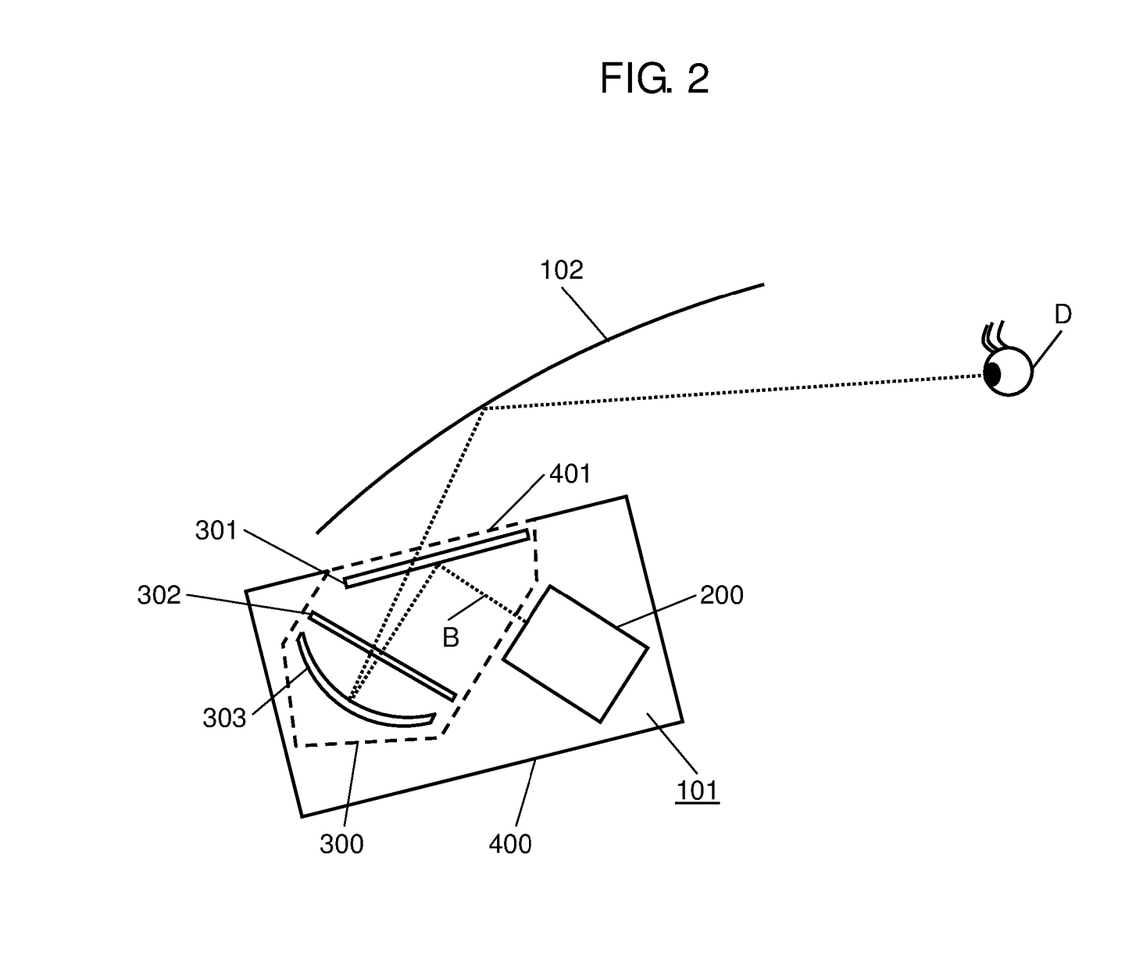
FIG. 2 is a schematic view illustrating structure of a head-up display in accordance with a first exemplary embodiment.

FIG. 2 is a schematic view of head-up display 101 seen from a sidewise direction of an automobile in the first exemplary embodiment. Head-up display 101 includes projector (first optical system) 200 that generates the first image and HUD optical system (second optical system) 300 that displays the first image as a virtual image.

Projector 200 is a projection image display device using LED or laser as a light source, and is an example of image light output device. A liquid crystal display or fluorescent display tube can also be used as the image light output device.

HUD optical system 300 includes reflective polarizer 301 disposed near opening 401 of HUD casing 400, quarter-wave plate 302 that is a phase difference plate, and concave mirror 303.

Reflective polarizer 301 has its peculiar polarization axis and is an optical element that transmits a linearly polarized light component parallel to the polarization axis and reflects a linearly polarized light component perpendicular to the polarization axis. For example, a wire grid film is used as reflective polarizer 301. This reflective polarizer 301 is an example of the first optical element, and has a planar shape in the exemplary embodiment. Reflective polarizer 301 is disposed eccentric to an optical axis of concave mirror 303, and is also placed to be inclined to an output surface of S-polarized image light B output from projector 200.

Quarter-wave plate 302 is a phase difference plate that shifts phases of two mutually-perpendicular polarized light components. A slow axis is arranged to be inclined by 45° with respect to the polarization axis of reflective polarizer 301. Quarter-wave plate 302 has a broad-band characteristic covering a wavelength range of image light output from projector 200. This quarter-wave plate 302 is an example of the third optical element.

Concave mirror 303 is a reflective optical element that has positive power, and has, for example, a free curved surface with no rotation symmetry. This concave mirror 303 is an example of the second optical element. To facilitate understanding of the structure, quarter-wave plate 302 and reflective polarizer 301 have the planar shape in the description. However, other shapes are also applicable. Still more, quarter-wave plate 302 may be formed by a film with an adhesive face to attach concave mirror 303 integrally.

Figure 3:
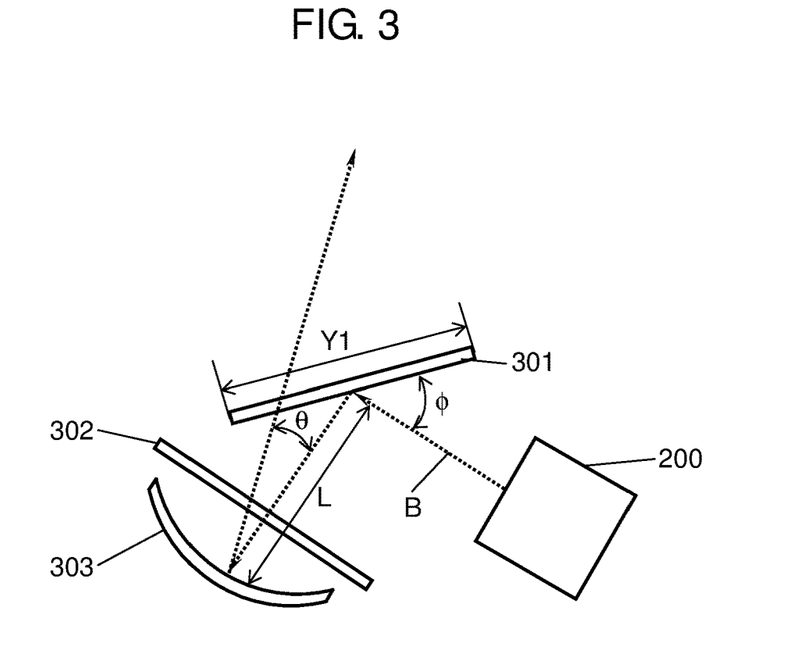
FIG. 3 is a schematic view illustrating layout of optical elements in the head-up display in accordance with the first exemplary embodiment.
Figure 4:
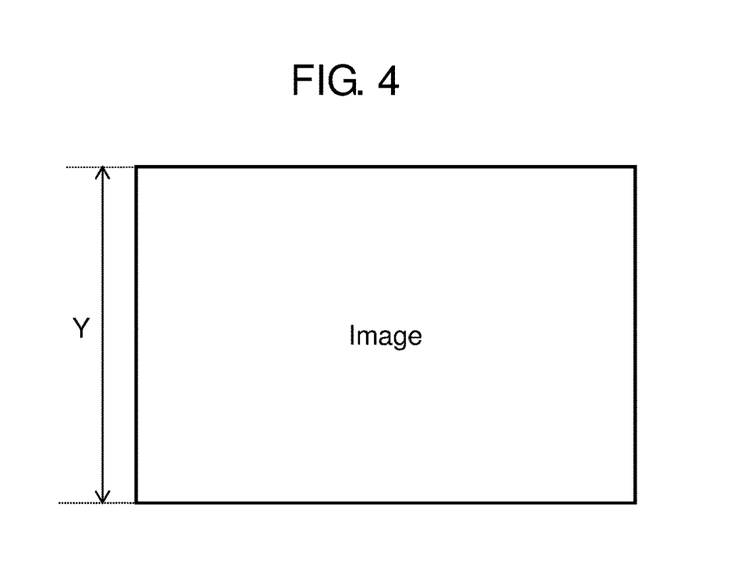
FIG. 4 is an image projected by the head-up display in accordance with the first exemplary embodiment.

FIG. 3 illustrates preferable positional relationship of projector 200, reflective polarizer 301, and concave mirror 303.

Concave mirror 303 is disposed such that angle θ formed by an incident light entering concave mirror 303 after the main light beam positioned at the center of the image light emitted from projector 200 is reflected on reflective polarizer 301, and a reflected light that is this incident light reflected on concave mirror 303 satisfies the following Formula 1.

$$\theta \le \tan^{-1}\left(\frac{Y \cos \phi}{L}\right) \quad \text{[Formula 1]}$$

Whereas,

Y: Length of an image in a short-axis direction (≈Y1) (See FIG. 4)

L: Surface interval between reflective polarizer 301 and concave mirror 303

θ: Angle formed by the optical axis of image light B output from projector 200 and reflective polarizer 301

A volume of HUD can be reduced by placing concave mirror 303 at a position that achieves the above relationship.

[1-3. Operation]

The operation of HUD optical system 300 in the first exemplary embodiment is described with reference to FIG. 5.

Figure 5:
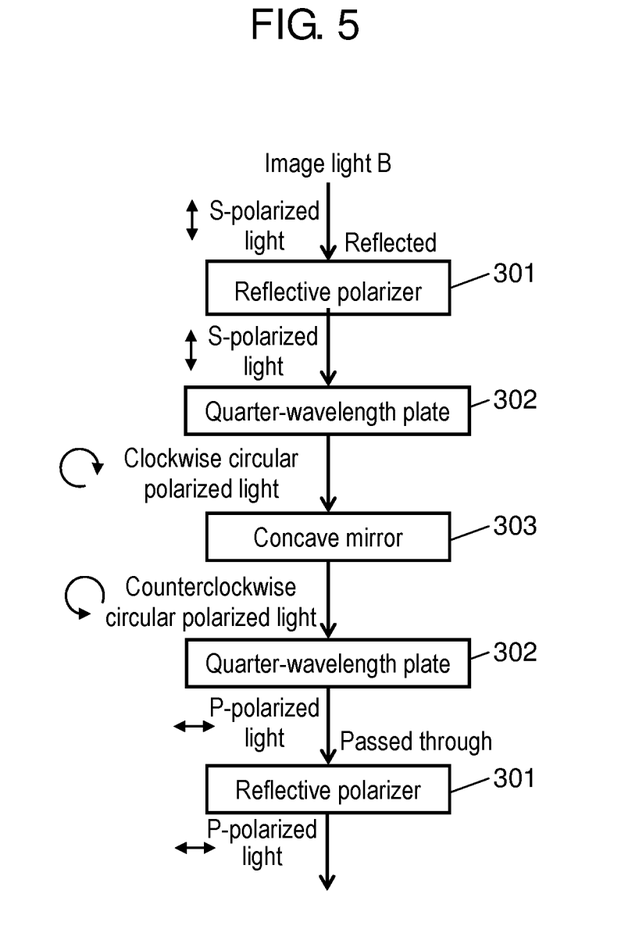
FIG. 5 is a flow chart of changes in polarization state of image light in the head-up display in accordance with the first exemplary embodiment.

FIG. 5 illustrates changes in the polarization state of image light B in head-up display 101 in order of proceeding.

For convenience sake, a transmitting direction of reflective polarizer 301 is called direction P and a reflecting direction is direction S in the description below. Linearly-polarized lights vibrating in these directions are called the P-polarized light and S-polarized light, respectively. The polarization state after converting the P-polarized light by quarter-wave plate 302 is called counterclockwise circular polarized light, and the polarization state after converting the S-polarized light by quarter-wave plate 302 is called clockwise circular polarized light. This is same for other exemplary embodiments, Since image light B output from projector 200 is S-polarized light, it is reflected on reflective polarizer 301, and enters quarter-wave plate 302. A phase of image light B is rotated for 90° by quarter-wave plate 302 and image light B becomes clockwise circular polarized light. Then, the rotating direction reverses at being reflected on concave mirror 303. The clockwise circular polarized light becomes counterclockwise circular polarized light and enters quarter-wave plate 302 again. Image light B of counterclockwise circular polarized light is converted to the P-polarized light by quarter-wave plate 302, and then enters reflective polarizer 301. Image light B thus passes through reflective polarizer 301, and enters windshield 102.

As described above, S-polarized image light B output from projector 200 passes through quarter-wave plate 302 back and forth to be converted to P-polarized image light B.

Image light B entering windshield 102 from head-up display 101 is reflected toward driver D and driver D views virtual image I of this image,

[1-4. Effect]

In the exemplary embodiment, the image light reciprocates in a space between reflective polarizer 301 and concave mirror 303, and thus sufficient optical length can be secured. Accordingly, HUD can be downsized HUD. Still more, since an angle to tilt concave mirror 303 toward driver D, which is an observer, can be relaxed, a vertical dimension of HUD optical system 300 can be reduced. Furthermore, with respect to optical performance, aberration due to eccentricity, such as distortion and astigmatic difference, can be reduced to improve picture quality. Since reflective polarizer 301 is disposed right under opening 401, about a half of external light entering head-up display 101 is reflected. This makes it difficult to see the internal structure, and also halves exposure of projector 200 to sunlight, extending the service life, of the device.

Variation 1 of First Exemplary Embodiment

Figure 6:
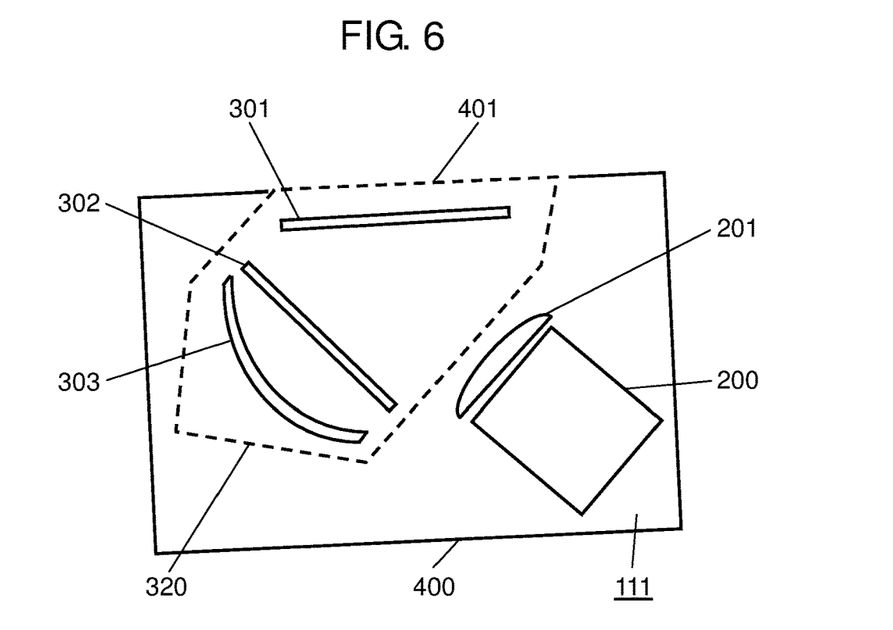
FIG. 6 is a schematic view illustrating a structure of the head-up display in accordance with variation 1 of the first exemplary embodiment.

FIG. 6. is a schematic view of a structure of head-up display 111 in variation 1 of the first exemplary embodiment. In head-up display 111, compared to head-up display 101, convex lens 201 is disposed near the output surface of image light B from projector 200, as shown FIG. 6. Convex lens 201 increases an optical face, and thus design flexibility increases. More specifically, the size of a projected image of projector 200 is adjustable. Convex lens is an example of a refractive optical element.

Variation 2 of First Exemplary Embodiment

Figure 7:
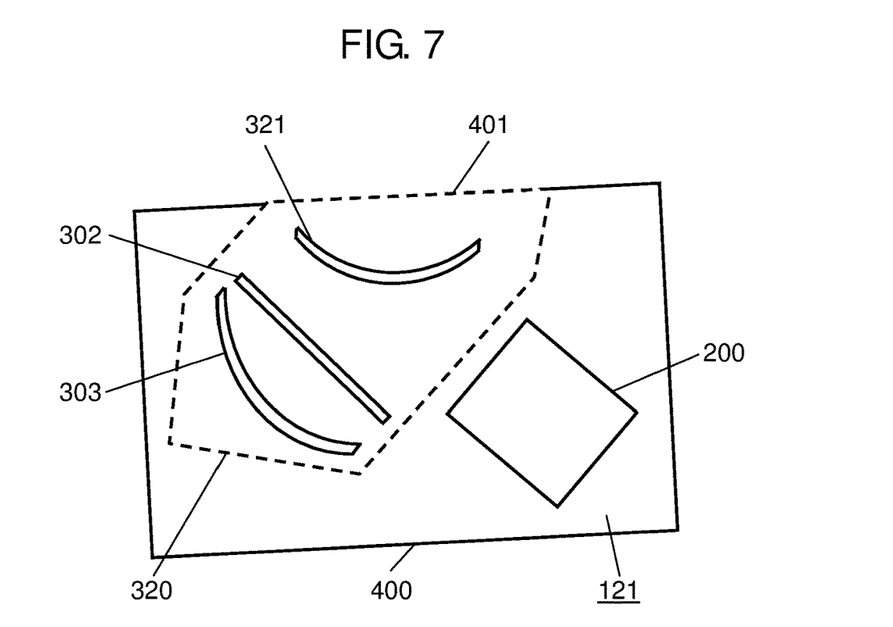
FIG. 7 is a schematic view illustrating a structure of the head-up display in accordance with variation 2 of the first exemplary embodiment.

FIG. 7 is a schematic view illustrating a structure of head-up display 121 in variation 2 of the first exemplary embodiment. Reflective polarizer 301 of head-up display 101 (HUD optical system 300) has a planar shape, but reflective polarizer 321 of head-up display 121 (HUD optical system 320) has a cylindrical shape with a concave surface toward the side of opening 401, as shown in FIG. 7. This cylindrical shape of reflective polarizer 321 reflects external light, such as sunlight, on reflective polarizer 321 to avoid external light from reaching driver D.

Second Exemplary Embodiment

Figure 8:
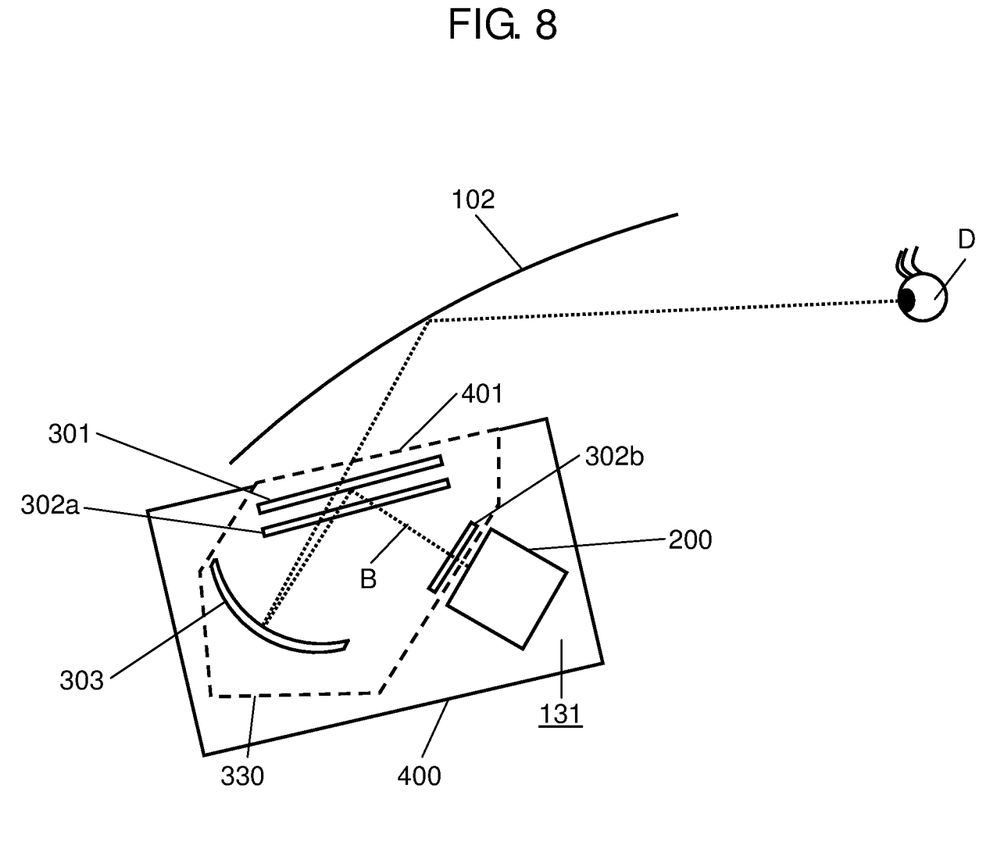
FIG. 8 is a schematic view illustrating a structure of a head-up display in accordance with a second exemplary embodiment.

Head-up display 131 in the second exemplary embodiment is described below with reference to FIG. 8. FIG. 8 is a schematic view illustrating a structure of head-up display 131 in the second exemplary embodiment. Image light B is output from head-up display 131 and reflected on windshield 106 that functions as a combiner to let driver D view virtual image I. This is same as that described in head-up display 101 in the first exemplary embodiment. However, a structure of HUD optical system 330 in head-up display 131 is different. In the exemplary embodiment, description mainly centers on a point different from the first exemplary embodiment in the structure of HUD optical system 330. Components same as those in the first exemplary embodiment are given the same reference marks.

[2-1. Structure of HUD]

Head-up display 131 includes first quarter wave plate 302a and second quarter-wave plate 302b, as shown in FIG. 8 instead of quarter-wave plate 302 described in the first exemplary embodiment. First quarter-wave plate 302a is disposed in proximity to and approximately parallel to reflective polarizer 301. Second quarter-wave plate 302b is disposed to the side of the output surface of projector 200 Image light B from projector 200 passes through second quarter-wave plate 302b and then first quarter-wave plate 302a, and is led to reflective polarizer 301. In the second exemplary embodiment, first quarter-wave plate 302a has a characteristic same as quarter-wave plate 302 described in the first exemplary embodiment, but is placed differently from quarter-wave plate 302 in the HUD optical system. Second quarter-wave plate 302b is an example of polarization adjustment element.

[2-2. Operation]

The operation of HUD optical system 303 in the second exemplary embodiment is described. S-polarized image light B emitted from projector 200 is converted to clockwise circular polarized light by passing through second quarter-wave plate 302b. Image light B converted to clockwise circular polarized light is converted to S-polarized light by passing through first quarter-wave plate 302a.

S-polarized image light B is reflected on reflective polarizer 301 disposed to be inclined with respect to the output surface of image light B emitted from projector 200, and then enters first quarter-wave plate 302a again. S-polarized image light B reflected on reflective polarizer 301 is converted to clockwise circular polarized light by passing through first quarter-wave plate 302a, and then enters concave mirror 303. The image light of clockwise circular polarized light entering concave mirror 303 is reflected and becomes counterclockwise circular polarized light, and then enters first quarter-wave plate 302a again. Counterclockwise circular polarized light entering first quarter-wave plate 302a is converted to P-polarized light and enters reflective polarizer 301. P-polarized image light B entering reflective polarizer 301 passes through reflective polarizer 301, and enters windshield 102. In this way, the image light passes through first quarter-wave plate 302 three times.

As described above, in HUD optical system 330, a polarization adjustment element that converts S-polarized light to clockwise circular polarized light is adopted as second quarter-wave plate 302b. However, a polarization adjustment element that converts P-polarized light to clockwise circular polarized light may also be adopted as second quarter-wave plate 302b.

Accordingly, image light B entering windshield 102 from head-up display 131 is reflected toward driver D, and thus driver D can view virtual image I of the image.

[2-3. Effect]

First quarter-wave plate 302 in the exemplary embodiment is overlaid close to reflective polarizer 301. This simplifies a retaining structure, and thereby enables to reduce cost of the retaining structure.

Third Exemplary Embodiment

Figure 9:
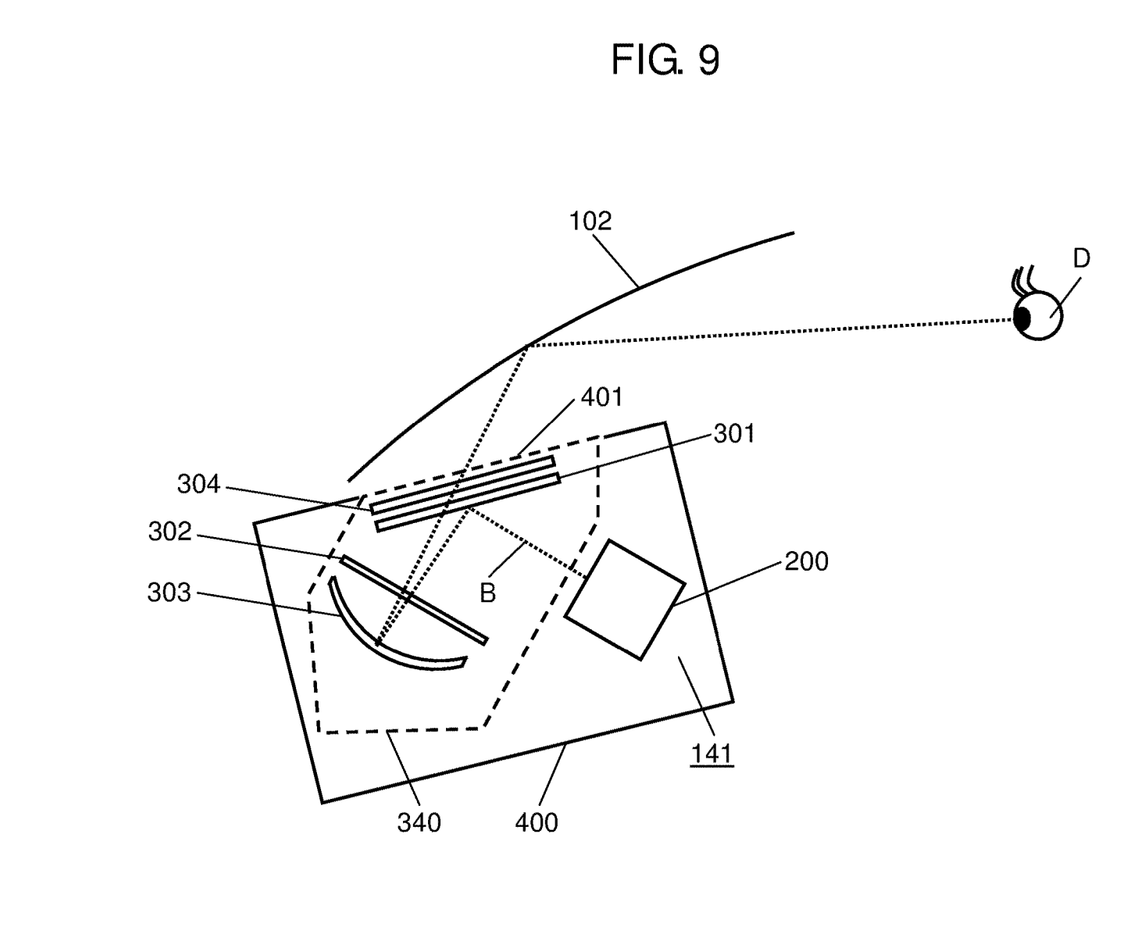
FIG. 9 is a schematic view illustrating a structure of a head-up display in accordance with a third exemplary embodiment.

Head-up display 141 in the third exemplary embodiment is described below with reference to FIG. 9. FIG. 9 is a schematic view illustrating a structure of head-up display 141 in the third exemplary embodiment. Image light B is output from head-up display 141, and reflected on windshield 102 that functions as a combiner to let driver D view virtual image I. This is same as that described in head-up display 101 in the first exemplary embodiment. However, a structure of HUD optical system 340 in head-up display 141 is different. In the exemplary embodiment, description mainly centers on a point different from the first exemplary embodiment in the structure of HUD optical system 340. Components same as those in the first exemplary embodiment are given the same reference marks.

[3-1. Structure of HUD]

The point different from the first exemplary embodiment is that second phase difference plate 304 is disposed between reflective polarizer 301 and windshield 102. This second phase difference plate 304 is an example of the fourth optical element.

This second phase difference plate 304 may be, for example, quarter-wave plate or half-wave plate.

[3-2. Operation]

The case of using a quarter-wave plate as second phase difference plate 304 is described below.

Image light B output from the projector is S-polarized light. Image light B is reflected on reflective polarizer 301 disposed to be inclined with respect to an output direction of image light B output from projector 200, and enters quarter-wave plate 302.

S-polarized image light entering quarter-wave plate 302 is converted to a clockwise circular polarized light and then enters concave mirror 303. The image light of clockwise circular polarized light entering concave mirror 303 is reflected and becomes a counterclockwise circular polarized light, and then enters quarter-wave plat 302 again. Counterclockwise circular polarized image light entering quarter-wave plate 302 is converted to P-polarized light and enters reflective polarizer 301. P-polarized image light entering reflective polarizer 301 passes through reflective polarizer 301 and enters second phase difference plate (quarter-wave plate) 304.

The image light entering second phase difference plate 304 (quarter-wave plate) is converted to a counterclockwise circular polarized light, and enters windshield 102.

In this way, the image light of counterclockwise circular polarized light entering windshield 102 from head-up display 141 is reflected toward driver D, and driver D can view a virtual image of the image.

[3-3. Effect]

When circular polarized image light is reflected to driver D, as described above, driver D can view the image without being disturbed even when driver D wears polarized sunglasses.

Variation of Third Exemplary Embodiment

The case of using half-wave plate, instead of quarter-wave plate, as second phase difference plate 304 is described. Second phase difference plate 304 (half-waveplate) can rotate the polarization direction of P-polarized light passing through reflective polarizer 301 by adjusting the direction of slow axis relative to reflective polarizer 301. In other words, second phase difference plate 304 (half-wave plate) partially converts light having the polarization direction of P-polarized light to S-polarized light.

This enables to achieve preferable reflectance of windshield 102 although an incident angle of image light entering windshield 102 from head-up display 141 is close to the Brewster angle.

Fourth Exemplary Embodiment

[4-1. Structure of HUD]

Figure 10:
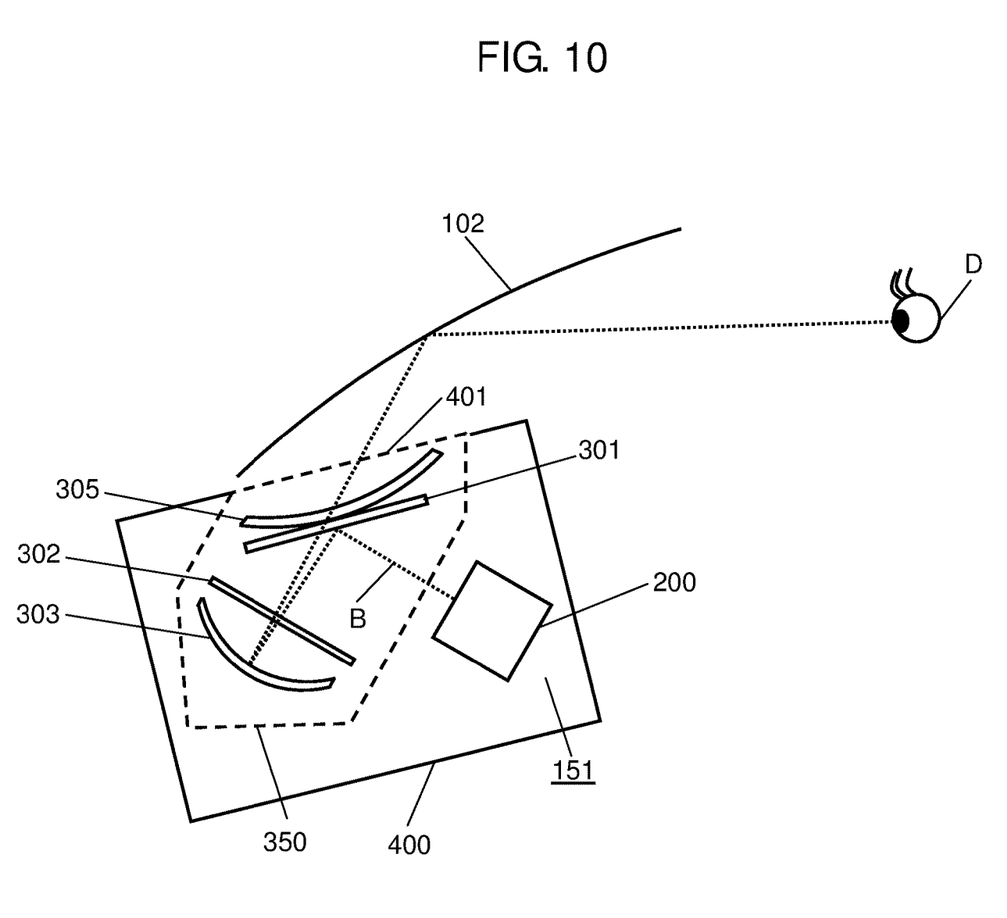
FIG. 10 is a schematic view illustrating a structure of a head-up display in accordance with a fourth exemplary embodiment.

FIG. 10 is a schematic view of a structure of head-up display 151 in an automobile in the fourth exemplary embodiment. A point that differs from head-up display 101 in the first exemplary embodiment is that HUD optical system 350 in head-up display 151 has louver optical element 305. Louver optical element 305 is disposed between reflective polarizer 301 and windshield 102. Louver optical element 305 is an example of the fifth optical element.

Figure 11:
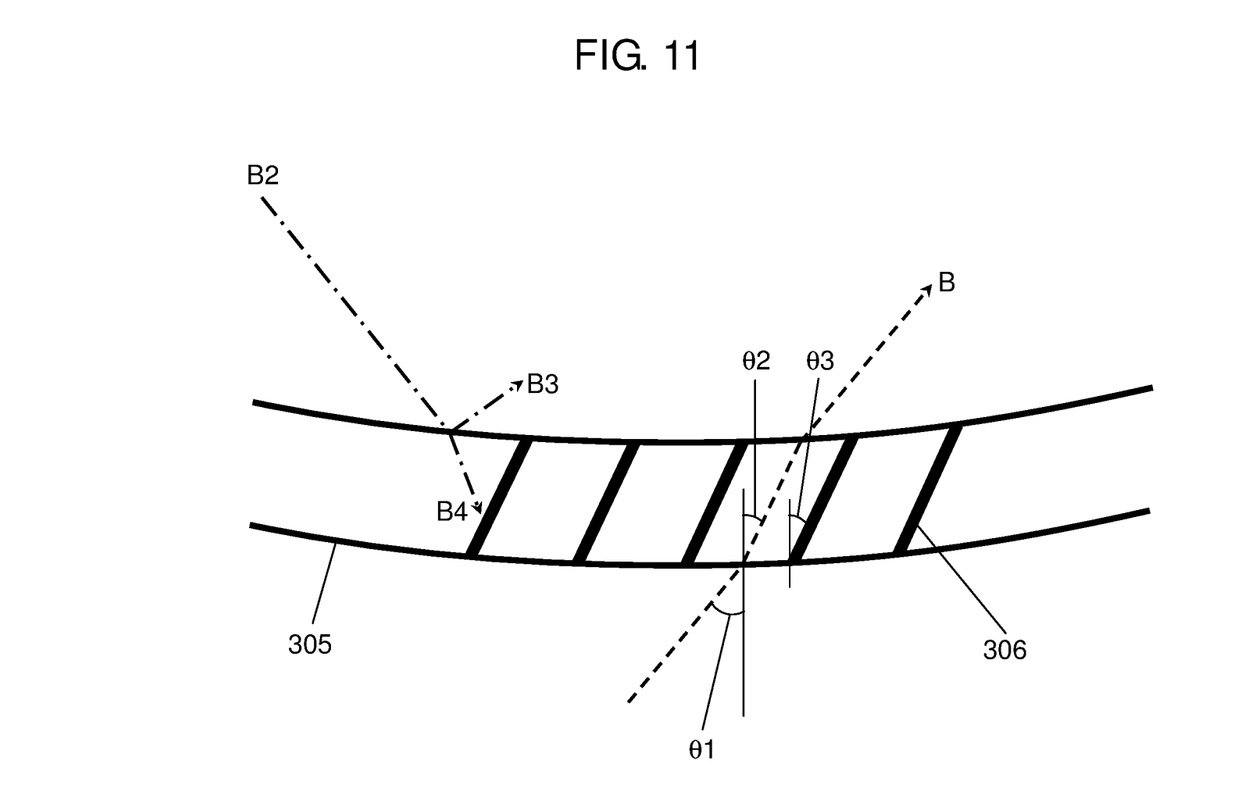
FIG. 11 is a fragmentary schematic view of a key part of a structure of a head-up display in accordance with the fourth exemplary embodiment.

FIG. 11 shows a structure of louver optical element 305. Louver optical element 305 has a structure in which light-shielding members 306 called louver are aligned inside approximately parallel to each other. Louver optical element 305 has a function to pass through light traveling parallel to light-shielding members 306 and absorb light in other directions. Louver optical element 305 is configured such that an angle of light-shielding members 306 is parallel to image light B that passes inside louver optical element 306. As louver optical element 305, for example, a louver film retained in a cylindrical shape with its concave face toward the side of opening 401 can be used, as shown in FIG. 10.

[4-2. Operation]

Head-up display 151 in which louver optical element 305 is disposed is described. As shown in FIG. 11, image light B passing through reflective polarizer 301 enters louver optical element 305 at incident angle θ1, and passes inside louver optical element 305 at angle θ2 by a refractive index difference between louver optical element 305 and air. Angle θ2 is equivalent to tilt angle θ3 of the louver, and thus the image light is led to windshield 102 without being absorbed inside louver optical element 305.

In this way, P-polarized image light B entering windshield 102 from head-up display 151 is reflected toward driver D, and driver D can view virtual image I of the image.

On the other hand, external light B2 entering head-up display 151 from outside is divided, on entering louver optical element 305, into reflective light B3 on the surface and transmission light B4 passing through inside. The cylindrical shape of louver optical element 305 reflects reflective light B3 in a direction not viewable by driver D. Transmission light B4 travels inside louver optical element 305 at an angle different from angle θ3 of light-shielding members 306, and thus is absorbed by light-shielding members 306.

[4-3. Effect]

Addition of louver optical element 305, as described above, prevents the driver from viewing external light, such as sunlight, and thus improves viewability of the image light.

The exemplary embodiments are described above to exemplify the technology disclosed in the present disclosure. The technology of the present disclosure, however, is not limited to these embodiments, but is applicable to other embodiments appropriately devised through modification, substitution, addition, omission, and so on. Furthermore, other exemplary embodiments may be achieved by combining components described in the above exemplary embodiments.

INDUSTRIAL APPLICABILITY

The present disclosure is applicable to head-up displays installed in automobiles, such as private cars.

What is claimed is:

1. A head-up display comprising:
   an image light source device for outputting image light;
   a first optical element provided to be inclined with respect to an output surface of the image light source device, the first optical element being configured to reflect the image light having a first polarization direction and allow the image light having a second polarization direction different from the first polarization direction to pass through;
   a second optical element configured to reflect the image light reflected by the first optical element, the image light reflected by the second optical element being reflected toward the first optical element; and
   a third optical element configured to shift a phase of polarized light, the third optical element being disposed between the first optical element and the second optical element such that (i) the image light reflected by the first optical element passes through the third optical element and (ii) the image light reflected by the second optical element passes through the third optical element,
   wherein after passing through the third optical element, the image light reflected by the second optical element has the second polarization direction, and
   wherein the image light passing through the first optical element is projected on a reflection element having transparency.

2. The head-up display of claim 1, wherein the first optical element has a planar shape.

3. The head-up display of claim 1, further comprising
   a refractive optical element that is disposed on an output surface side of the image light output device,
   wherein the image light passes through the refractive optical element.

4. The head-up display of claim 1, wherein the first optical element has a cylindrical shape.

5. The head-up display of claim 1, further comprising
   a fourth optical element that is disposed between the first optical element and the reflection element having transparency, and
   wherein the fourth optical element partially converts the image light having the second polarization direction to the image light having the first polarization direction.

6. The head-up display of claim 1, wherein the image light passes through the third optical element three times.

7. The head-up display of claim 6, further comprising
a polarization adjustment element that is disposed on an output surface side of the image light output device,
wherein the image light passes through the polarization adjustment element.

8. The head-up display of claim 1, wherein the second optical element is a concave mirror.

9. The head-up display of claim 1, wherein the third optical element is a quarter-wave plate, and a slow phase axis of the third optical element is inclined by 45° with respect to an axis including the first polarization direction.

10. The head-up display of claim 1, further comprising
a fifth optical element that is disposed between the first optical element and the reflection element having transparency, and
wherein the fifth optical element has a light-shielding member inside.

11. The head-up display of claim 1, wherein
angle θ formed by the image light entering the second optical element and the image light reflected on the second optical element satisfies Formula 1 below, $$\theta \le \tan^{-1}\left(\frac{Y \cos\phi}{L}\right) \quad \text{Formula 1}$$

Wherein
Y is a length of an image in a short-axis direction
L is a surface interval between the first optical element and the second optical element, and
ø is an angle formed by an optical axis of the image light output from the image light source device and the first optical element.

12. A vehicle comprising the head-up display according to claim 1.

13. A system for display on a windshield of an automobile, the system comprising:
a projector for outputting image light;
a reflective polarizer provided to be inclined with respect to an output surface of the projector, the reflective polarizer being configured to reflect the image light having a first polarization direction and allow the image light having a second polarization direction different from the first polarization direction to pass through;
a concave mirror configured to reflect the image light reflected by the reflective polarizer, the image light reflected by the concave mirror being reflected toward the reflective polarizer; and
a quarter-wave plate configured to shift a phase of polarized light, the quarter-wave plate being disposed between the reflective polarizer and the concave mirror such that (i) the image light reflected by the reflective polarizer passes through the quarter-wave plate and (ii) the image light reflected by the concave mirror passes through the quarter-wave plate,
wherein after passing through the quarter-wave plate, the image light reflected by the concave mirror has the second polarization direction, and
wherein the image light passing through the reflective polarizer is projected on the windshield of the automobile.

* * * * *